May 12, 1959

H. J. FELDHAKE 2,885,796

DEVICE FOR PHYSICALLY DEMONSTRATING THE FORMULA
FOR THE AREA OF A TRIANGLE

Filed May 6, 1957

INVENTOR.
HERBERT J. FELDHAKE
BY
ATTORNEYS.

May 12, 1959

H. J. FELDHAKE 2,885,796

DEVICE FOR PHYSICALLY DEMONSTRATING THE FORMULA
FOR THE AREA OF A TRIANGLE

Filed May 6, 1957

INVENTOR.
HERBERT J. FELDHAKE
BY
Lawrence S. Epstein
ATTORNEYS

United States Patent Office 2,885,796
Patented May 12, 1959

2,885,796

DEVICE FOR PHYSICALLY DEMONSTRATING THE FORMULA FOR THE AREA OF A TRIANGLE

Herbert J. Feldhake, Chicago, Ill.

Application May 6, 1957, Serial No. 657,464

5 Claims. (Cl. 35—34)

(Granted under Title 35, U.S. Code (1952), sec. 266)

The invention described herein may be manufactured and used by or for the Government of the United States of America for governmental purposes without the payment of any royalties thereon or therefor.

This invention relates to a device providing a physically meaningful demonstration of mathematical formulas and, in particular, to such a device for the demonstration of the formula for the area of a triangle.

Mathematics is an abstract subject which is generally taught by means of symbols and figures drawn upon a blackboard. It is a well-known fact that many pupils find it difficult to learn by this method, but are aided in their learning by physical demonstrations of abstract principles and the properties of geometrical forms.

The present invention provides a device for demonstrating the physical meaning of mathematical formulas containing terms of the area and volume type (second and third order terms). Terms on one side of the formula are represented by areas or volumes formed in a containing structure preferably fabricated from transparent plastic material. Terms on the other side of the formula are represented by other areas or volumes of simple, easily comprehended, geometrical forms, such as squares, rectangles or cubes, equivalent in total area or volume, respectively, to the total area or volume of the terms on the first side of the formula. The areas or volumes representing the terms on one side of the formula communicate with those on the other side. A freely mobile material, preferably spherical pellets, covers the total area or fills the total volume representing all terms on one side of the formula. Equivalence of both sides of the formula is demonstrated by transferring the mobile material to the areas or volumes corresponding to the terms on the other side of the formula.

An object of the invention is to provide a device particularly useful in teaching mathematics.

Another object is to provide a device capable of furnishing a physically meaningful demonstration of a mathematical formula containing second or third order terms.

A further object is to provide a device capable of furnishing a physically meaningful demonstration of the formula for the area of a triangle.

Still another object is to provide a device which enables students to more quickly and easily understand the meaning of certain mathematical formulas and to remember them for a longer period of time.

Other objects and many of the attendant advantages of this invention will be readily appreciated as the same becomes better understood by reference to the following detailed description when considered in connection with the accompanying drawings wherein.

Figure 1:
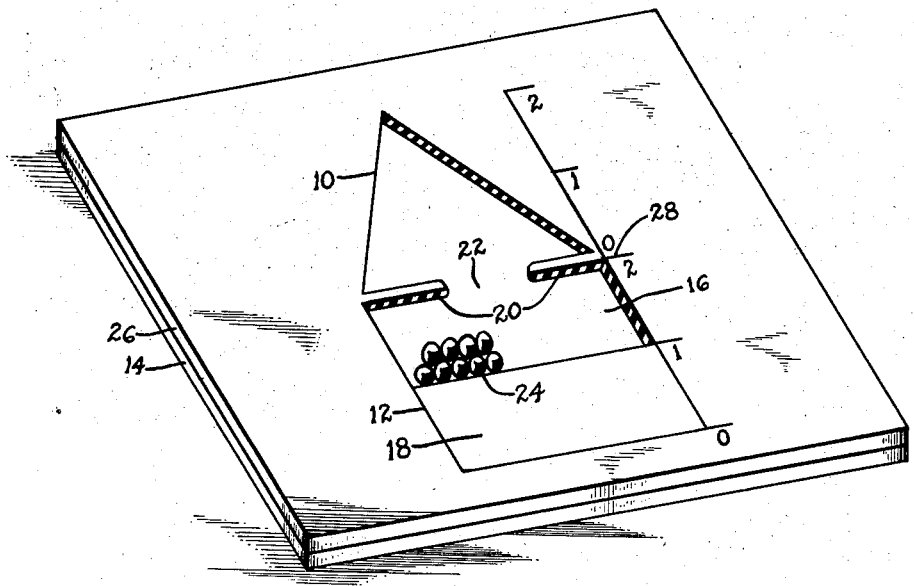
Fig. 1 is a perspective view of an embodiment of the invention.

Fig. 1 illustrates an embodiment of the invention in which a triangular area 10 and a rectangular area 12 are excised from the flat upper surface of a board 14 which may assume any peripheral shape. The base of the triangle 10 and one side of the rectangle 12 are of equal dimension and are substantially coincident in this embodiment, although they may be more widely separated. The rectangular area 12 is divided into two equal sections, the first 16 being cut to the same depth as the triangular area 10 and the second 18 being cut to a very shallow depth or merely being delineated by lines on the surface of the board 14. The excisions do not extend completely through the depth of the board 14.

A pair of partitions 20 extend inwardly from the sides of the excised area at the junction of the base of the triangle 10 and the top of the rectangle 12. These partitions 20 are not absolutely necessary but are preferable. An aperture 22 is left between the partitions 20 to provide a communicating passageway between the triangular and rectangular areas 10 and 16.

Freely mobile material, preferably in the form of spherical pellets 24 such as marbles, buckshot or ball bearings, is placed within the excised areas. The freely mobile material may also be a fluid such as sand or colored liquid.

If pellets 24 comprise the freely mobile material, it is preferable to employ a sufficient quantity to completely cover the triangular area 10 with a single layer; otherwise, a sufficient quantity to completely fill the volume of the excised triangle to the level of the upper surface of the lower board 14 should be utilized.

The lower board 14 is covered by a transparent upper board 26 or rigid sheet of transparent material sufficient in extent to cover the excised area in the lower board 14. If the freely mobile material employed is a fluid, a leakproof junction must be formed between the two boards; otherwise, a simple temporary clamp may be used. The lower board 14 may be fabricated from any suitable material such as wood, plastic, metal, etc. The upper board 26 is fabricated from a transparent material such as transparent plastic or glass.

Measuring lines 28 may be marked upon the surface of the upper or lower board to indicate the altitudes of the triangle 10 and the rectangle 12.

The formula for the area of a triangle is ½BA where B equals the base and A the altitude of the triangle. This is equivalent to one-half the area of a rectangle having a side equal to B and a side equal to A. Since the rectangle 12 has a side which is equal to the base of the triangle 10 and a side which is equal to the altitude, the area of the rectangle 12 is equivalent to BA. Therefore, the area of the triangle 10 equals one-half the area of the rectangle 12, or equals the rectangular area 16 which is one-half the area of rectangle 12.

To demonstrate the equivalence of the triangular area 10 to one-half the rectangular area 12, the triangular area 10 is completely covered by the spherical pellets 24. The entire structure is then inverted and the pellets 24 are allowed to pass into the rectangular area 16 which becomes completely covered.

Figure 2:
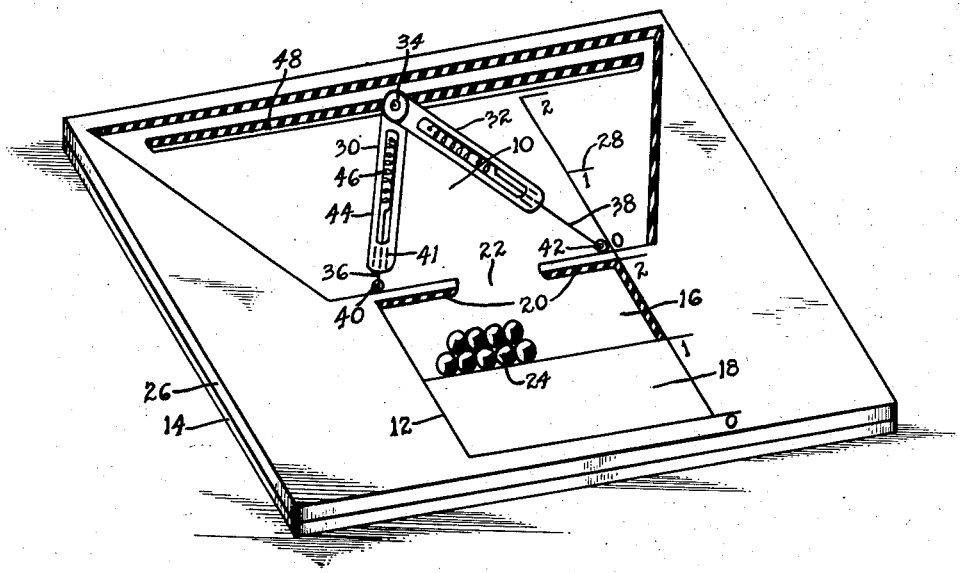
Fig. 2 is a perspective view of a preferred embodiment of the invention in which the shape of the triangle is variable.

The embodiment shown in Fig. 2 is a more generalized form of the invention in which the shape of the triangle 10 can be varied while the base and altitude dimensions are maintained constant.

The sides of the triangle 10 are formed by two arms 30 and 32 pivoted upon a pivot slide 34 situated at the apex of the triangle and by cables 36 and 38 extending from the lower ends of the arms to pivot points 40 and 42, one pivot point being located at each end of the base. The base of the triangle 10 extends from pivot point 40 to pivot point 42. The cables, or arm extensions, may be made of any suitable material such as wire, cord, etc., or even a rigid material such as a metal rod. A longitudinal slot 44 in the central region of each arm mounts and retains a spring 46 which is attached to the arm near its pivotal end. The cable 36 from the base pivot point runs through a passage 41 drilled through the arm from the end nearest the base pivot point to the end of the slot. Cable 36 may comprise an elongated rod secured to the spring end, or may even comprise extensions of the springs themselves.

Another slot 48 in the upper board 26 runs parallel to the base of the triangle 10 and preferably is longer than the base. The apical pivot slide 34 of the triangle 10 extends upward through the pivot-slide slot 48, the movements of the slide 34 being constrained by said slot 48 along a line parallel to the base. The apical pivot slide 34 is supported by flanges resting upon the upper surface of the upper board 26, although it may be designed to slide or roll along the bottom of the excised area. The slide 34 may be moved to any point along the slide-pivot slot 48, thereby changing the angles and shape of the triangle 10. As the positions of the arms 30 and 32 are altered, the lengths of cable 36 from the ends of the arms to the base pivot points 40 and 42 change correspondingly, the cables being maintained in taut condition by the tension of the springs 46.

The movements of the pivot slide 34 may be constrained by other means such as by extending the pivot shaft of the pivot slide 34 downward into a slot cut in the lower board 14. The function of the upper slot 48 would then be merely to permit access to the slide 34 so that it may be moved.

Figure 3:
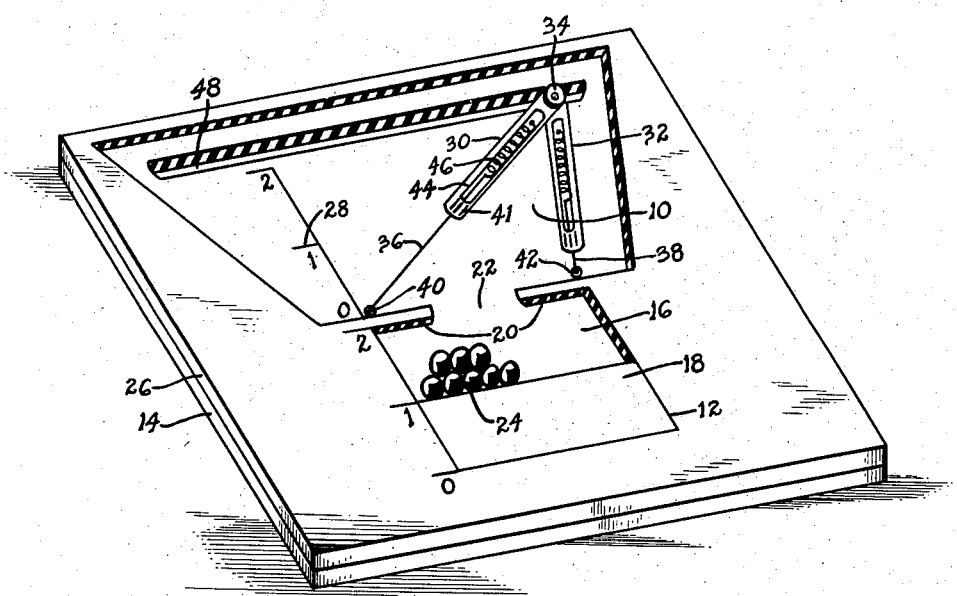
Fig. 3 is a perspective view of the embodiment of Fig. 2, in which the arms of the triangle are shown in another position.

The manner in which a change in the position of the slide pivot 34 alters the shape of the triangle 10 is shown in Fig. 3. Note that although the shape of the triangle 10, the angles and the lengths of the sides have changed, the base and altitude dimensions remain the same. Thus, the area of the triangle 10 must remain the same.

In this second embodiment, pellets 24 must be employed and must be sufficiently large in diameter to enable the arms 30 and 32 and the cables 36 and 38 to serve as retaining walls.

Cables fabricated from elastic material may be substituted for the inelastic cables and the springs.

Obviously many modifications and variations of the present invention are possible in the light of the above teachings. It is therefore to be understood that within the scope of the appended claims the invention may be practiced otherwise than as specically described.

What I claim is:
1. A device for providing a physical demonstration of the mathematical formula for the area of a triangle comprising, in combination: a structure formed with two excised sections extending partially therethrough, one section having a rectangular shape; means in the second section forming a triangularly shape area, said means comprising a pair of arms, slide means and a pair of arm extensions, one end of each arm pivoted about said slide means to form the apex of a triangle, and each arm associated with a different one of said extensions to form one side of said triangle, each said extension elastically secured at one end to its associated arm and pivotally secured at the other end to said structure, the distance between said points at which said extensions are pivotally secured corresponding to the base of the triangle and being equal to one side of said rectangle, and the altitude of said triangle being equal to another side of said rectangle, an elongated slot in said second section, said slot being parallel to the base of the triangle and having the slide means extending therethrough, triangles of different shape being formed when said slide means is moved about within said second section, and said base of said triangle and said equal side of said rectangle being formed with apertures therein which communicate with each other whereby a passage between said triangular and rectangular areas is formed; and pellets in sufficient amount to completely cover the triangular area in a single layer, said passage being of sufficient dimension to permit transfer of said pellets between said areas.

2. A device as set forth in claim 1, wherein said pellets are spherical in shape.

3. A device as set forth in claim 1, including means marking off the altitudes of said triangle and said rectangle in terms of dimensional units.

4. A device for providing a physical demonstration of the mathematical formula for a triangle comprising, in combination: a structure formed with two excised sections extending partially therethrough, one section having a rectangular shape, and both said sections being covered with transparent material; means located within the second section delimiting a triangular area, said means comprising a pair of arms, slide means and a pair of arm extensions, one end of each arm pivoted about said slide means to form the apex of a triangle, and each arm associated with a different one of said extensions to form one side of said triangle, each said extension elastically secured at one end to its associated arm and at the other end pivotally secured to said structure, the distance between said points at which said extensions are pivotally secured corresponding to the base of the triangle and being equal to one side of said rectangle, triangles of different shape being formed when said slide means is moved, and said base of said triangle and said equal side of said rectangle being formed with apertures therein which communicate with each other whereby a passage between said triangular and rectangular areas is formed; means in said second section receiving said slide and constraining said slide means to move only along a line parallel to the base of said triangle whereby the altitude of said triangle always remains constant in dimension, the altitude being equal to another side of said rectangle; and pellets in sufficient amount to completely occupy the volume bounded by the triangle and the confronting surfaces of the excised area and the transparent cover.

5. A device as set forth in claim 4, wherein only one-half of the rectangular area, namely, that half to which said passage connects, has sufficient depth to accommodate any of said pellets.

References Cited in the file of this patent

UNITED STATES PATENTS

| 296,018 | Kennedy | Apr. 1, 1884 |
| 1,642,236 | Foster | Sept. 13, 1927 |

FOREIGN PATENTS

| 22,006 | Great Britain | of 1903 |
| 529,461 | Great Britain | Nov. 21, 1940 |